United States Patent [19]
Stucchi et al.

[11] Patent Number: 5,443,291
[45] Date of Patent: Aug. 22, 1995

[54] QUICK-COUPLING PIPE FITTING

[75] Inventors: Giovanni Stucchi, Treviglio; Marco Gatti, Pognano, both of Italy

[73] Assignee: Stucchi s.r.l., 24053 Brignano Gera d'Adda (Bergamo), Italy

[21] Appl. No.: 93,959

[22] Filed: Jul. 21, 1993

[30] Foreign Application Priority Data

Jul. 22, 1992 [IT] Italy ................. MI92A1765

[51] Int. Cl.6 .................................... F16L 37/18
[52] U.S. Cl. ..................... 285/316; 137/614.03
[58] Field of Search ................. 285/315, 316; 137/614.03, 614.04

[56] References Cited

U.S. PATENT DOCUMENTS

| | | | |
|---|---|---|---|
| 2,449,938 | 9/1948 | Hansen | 137/614.03 |
| 2,451,218 | 10/1948 | Hengst | 137/614.04 |
| 2,456,045 | 12/1948 | Brock | 137/614.03 |
| 2,505,093 | 4/1950 | Brock | 137/614.03 |
| 2,839,314 | 6/1958 | Clark | 137/614.03 |
| 3,706,318 | 12/1972 | Baniadam et al. | 137/614.03 |
| 4,098,292 | 7/1978 | Evans | 137/614.04 |
| 4,444,223 | 4/1984 | Maldavs | 137/614.04 |
| 4,625,761 | 12/1986 | Uchida et al. | 137/614.03 |
| 5,255,714 | 10/1993 | Mullins | 137/614.03 |

FOREIGN PATENT DOCUMENTS

| | | | |
|---|---|---|---|
| 647902 | 9/1962 | Canada | 137/614.03 |
| 0477949 | 1/1992 | European Pat. Off. | |
| 859331 | 5/1939 | France | 137/614.04 |
| 1015631 | 8/1952 | France | 137/614.03 |
| 1316054 | 2/1962 | France | 137/614.03 |
| 1330518 | 4/1963 | France | 137/614.03 |
| 581087 | 1/1946 | United Kingdom | |
| 610562 | 10/1948 | United Kingdom | 137/614.03 |
| 856471 | 12/1960 | United Kingdom | 137/64.04 |
| 958263 | 5/1964 | United Kingdom | 137/614.04 |
| 1223781 | 3/1971 | United Kingdom | 137/614.03 |
| 8808499 | 3/1988 | WIPO | |

*Primary Examiner*—Randolph A. Reese
*Assistant Examiner*—Heather Chun Shackelford
*Attorney, Agent, or Firm*—Sixbey, Friedman, Leedom & Ferguson; Gerald J. Ferguson, Jr.; Tim L. Brackett

[57] ABSTRACT

A quick-coupling pipe fitting, comprising a female element and a male element that can be coupled together, formed by fixed parts and by axially slidable parts that, when at rest, arrange themselves in a position Wherein they close the passage of the fluid and, when the two elements are coupled together, they are displaced from engagement with corresponding parts of the other element in a position wherein the abovementioned passage is open, The male and female elements can be coupled and their parts have coplanar surfaces at mutually connectable ends.

4 Claims, 3 Drawing Sheets

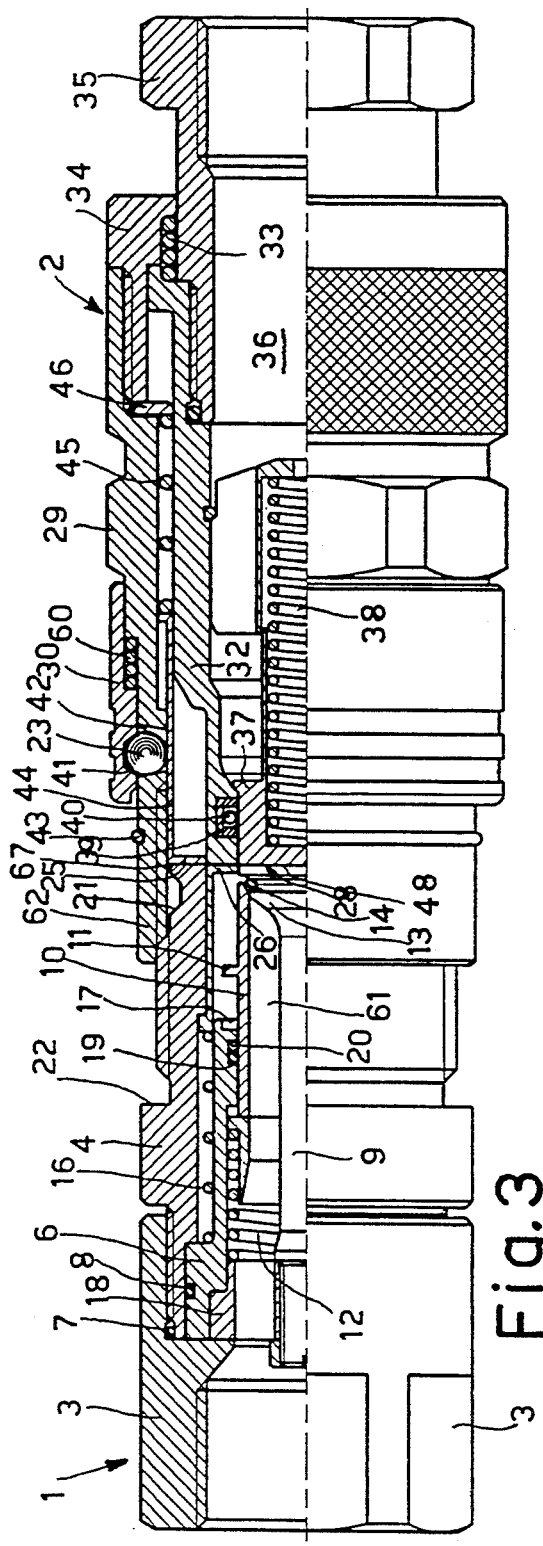
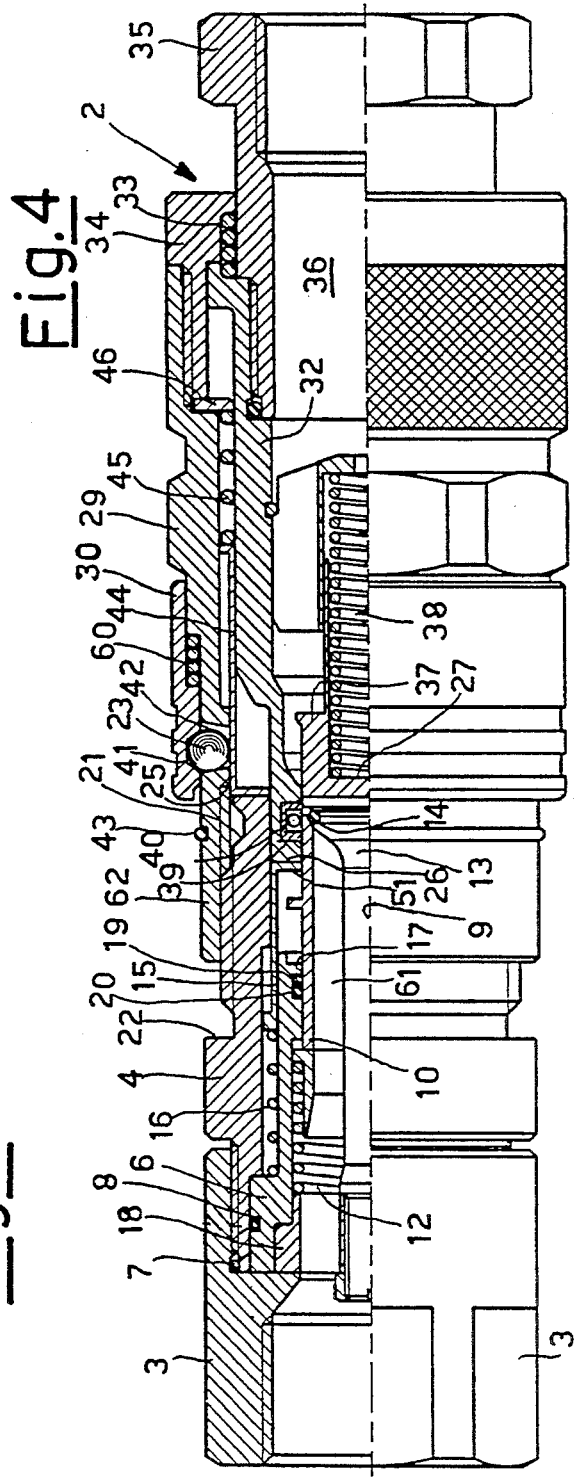

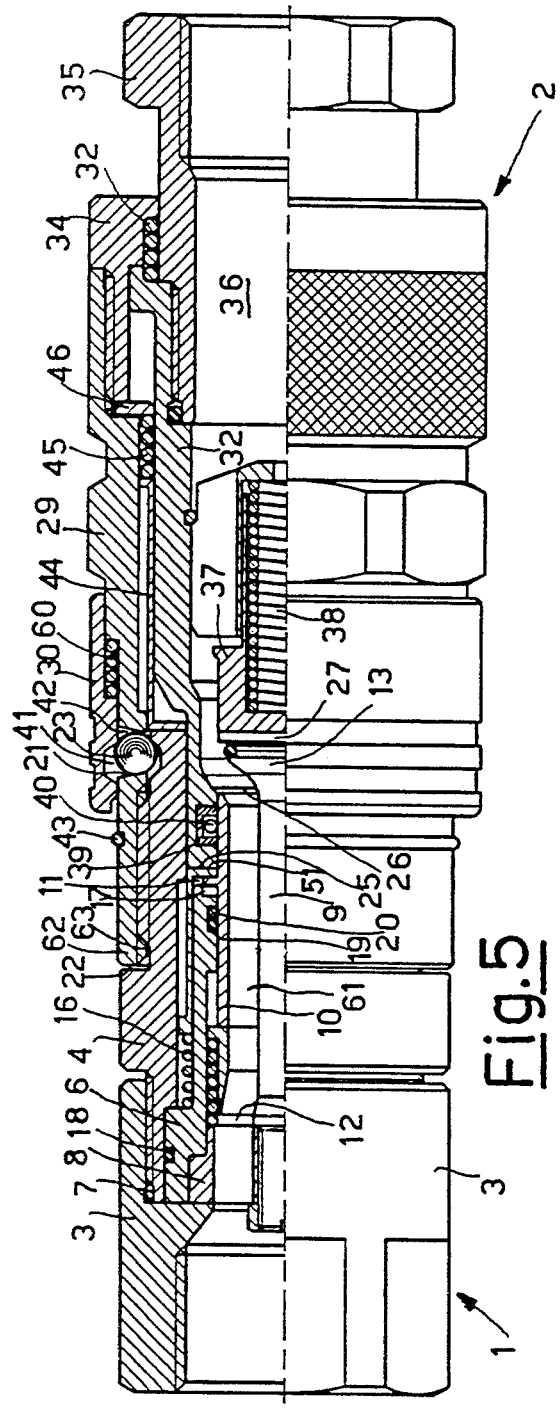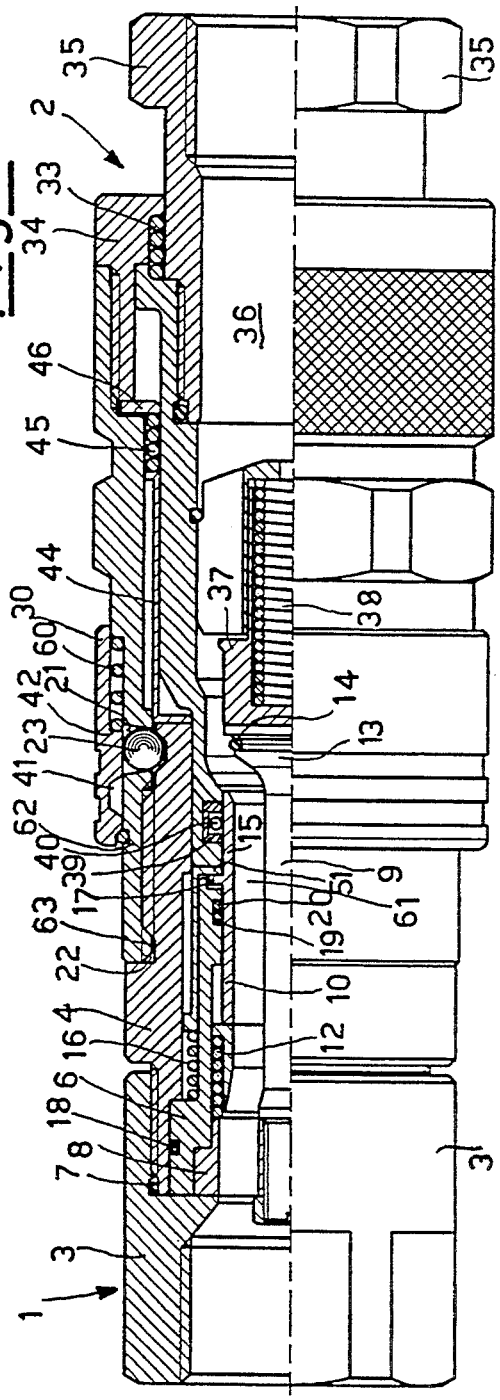

QUICK-COUPLING PIPE FITTING

BACKGROUND OF THE INVENTION

The present invention relates to a quick-coupling pipe fitting.

In the hydraulic sector it is frequently necessary to have fittings that can be coupled quickly to connect flexible or rigid pipes, in turn connected to a fluid supply and to a user.

Known quick-coupling pipe fittings are generally constituted by two elements, male and female, engaged on respective pipes to be connected to and coupled by screwing or by quick-action means.

According to a currently known art the female element is accomplished by means of a structure comprising an internal casing inserted at one end of an internally threaded nut for connection toward the supply or the user and by an external casing coaxial with said internal casing.

The internal casing supports an internal stem coaxial with an enlarged end. Externally to this, concentrically, so that an annular cavity is left, there is engaged a sealing bush that, under the elastic action of positioning springs and by engagement with the enlarged end of the stem, completely prevents the passage of the fluid in the cavity in the absence of coupling with the male element.

Concentrically and externally to the bush, there is a unit for cleaning the same constituted by a cup with a corresponding positioning spring.

To the internal casing, between it and a rear portion of the axial stem, there is fixed an annular spoked element in which there are obtained six small diameter holes for the passage of the fluid. As an alternative, so as to avoid the turbulence connected with the presence of holes having a small diameter, such annular element can be provided with at least two passage ports in the form of successive annular sectors, spaced by narrow spokes, along a circumference of said annular element.

The male element generally comprises an external casing provided with means for coupling with the female element at one end and an internally threaded nut at the other end for coupling toward the supply or to the user. Inside said casing, in a concentric position and so as to leave an annular cavity, there is a piston urged by corresponding positioning springs in a front closing position.

During the coupling between the female fitting and the male fitting, the cup of the female element is pushed by the external casing of the male element and, during its translation, carries the bush with it against the urging force of the corresponding positioning spring. At the same time the piston of the male element is urged to return inside the external casing of the male element against the force of the corresponding positioning spring up to a cavity opening position.

Coupling between the male and female element of the fitting, is generally obtained through quick-action coupling means. This creates a drawback since a comparatively quick wear of the fitting results in the coupling area.

Other types of fittings are also known wherein the coupling between the male and female element is accomplished by screwing, exploiting appropriate threads provided outside the female element and inside a terminal cavity of the male element.

These other types of fittings have the drawback of making it possible for dirt to be included inside the fitting itself. Such an effect is due to a non-flat shape of the terminal surface of the male element.

SUMMARY OF THE INVENTION

The object of the present invention is to provide a quick-coupling fitting for which the possibility of introducing dirt inside the mechanism during the coupling stage is negligible; it is also required that the coupling can take place without spilling any fluid and also without including any air inside the fitting.

According to the present invention such object is attained by means of a quick-coupling fitting, comprising a female element and a male element that can be coupled together, which elements are formed by fixed parts and by axially slidable parts that, when at rest, arrange themselves in a position wherein they close the passage of the fluid and, when the two elements are coupled together, they are displaced from engagement with corresponding parts of the other element in a position wherein the abovementioned passage is open, characterized in that said male and female elements can be coupled together by screw-based connecting means and their said parts have coplanar surfaces at mutually connectable ends.

It appears evident that the provision of both elements with coplanar end faces allows the elimination of the drawbacks linked with the inclusion of dirt inside the fitting; at the same time, the use of screw-based connecting means allows the coupling of said male and female elements with a reduced possibility of wear and with no spilling of fluid or inclusion of air, since the transfer of fluid takes place only when the partially-assembled fitting is already closed toward the outside and is sufficiently resistant to the pressures exerted by the fluid itself.

These and other features of the present invention shall be made more evident by the following detailed description of an embodiment thereof illustrated as a non-limiting example in the enclosed drawings.

BRIEF DESCRIPTION OF THE DRAWINGS

FIG. 3 shows the fitting according to the invention, again in a partially-sectioned longitudinal view, represented in a first stage of the coupling movement;

FIG. 4 shows the fitting according to the invention, again in a partially-sectioned longitudinal view, represented in a second stage of the coupling movement;

FIG. 5 shows the fitting according to the invention, again in a partially-sectioned longitudinal view, represented in a third stage of the coupling movement;

FIG. 6 shows the fitting according to the invention, again in a partially-sectioned longitudinal view, as it can be seen after coupling and clamping of the two male and female elements.

DETAILED DESCRIPTION OF THE PREFERRED EMBODIMENT

Figure 1:
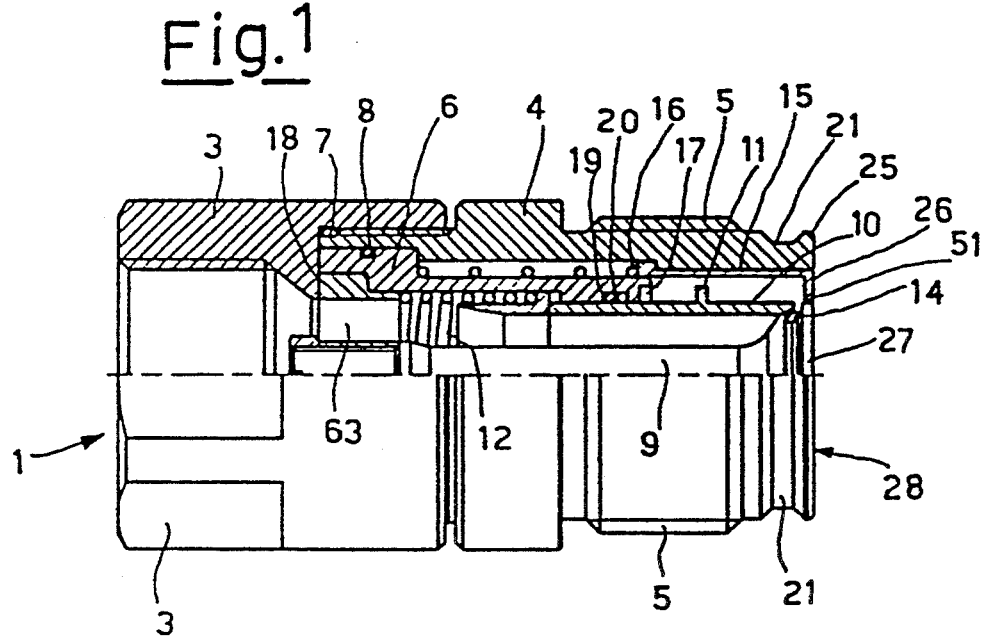
FIG. 1 is a partially-sectioned longitudinal view of the female element of the fitting according to the invention.
Figure 2:
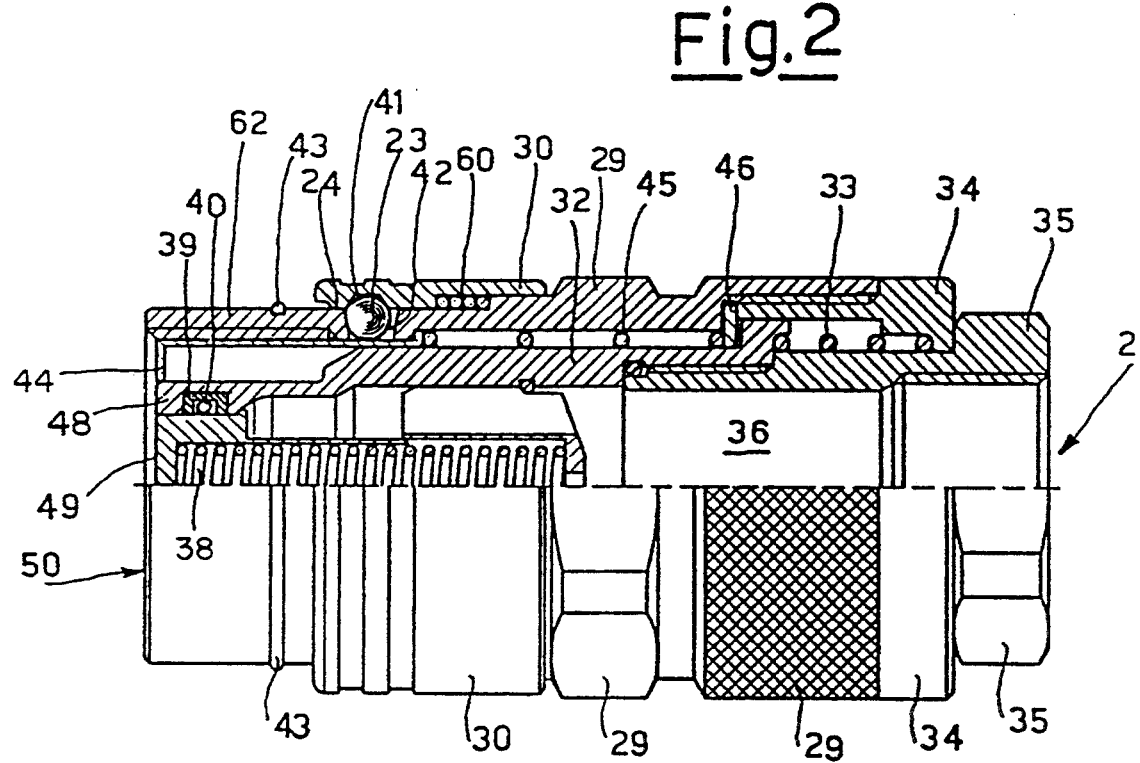
FIG. 2 is a partially-sectioned longitudinal view of the male element of the same fitting.

With reference to FIGS. 1, 2 and 6, the fitting according to the invention is constituted by a female element 1 and by a male element 2.

The female element 1 (FIG. 1) comprises, rigidly joined together, a nut 3 with an internal thread for connecting to a fluid supply or to a user, an external casing 4 screwed in said nut 3 at one end, an annular base 18 with several ports 63 for the passage of the fluid and an internal casing 6, arranged concentrically with respect to the external casing 4. The perfect seal between said external casing 4 and said nut 3 is ensured by a gasket 7.

The annular base 18 supports an internal axial stem 9. Externally and concentrically with the stem 9, so as to leave an annular cavity 61, there is arranged a sealing bush 10, provided with protruding elements 11; under conditions of rest, with the fitting open, said sealing bush 10 is urged, in an axial direction, by a spring 12 that pushes said bush 10 toward the right (FIG. 1); the engagement with an enlarged end 13 of the stem 9 balances the force exerted by said spring 12 and keeps the bush 10 in an equilibrium position.

With the abovementioned enlarged end 13 of the stem 9 there is associated a sealing gasket 14 that prevents the passage of the fluid under conditions of rest.

Concentrically and externally to the sealing bush 10 and inside the external casing 4, there is a unit for cleaning the bush itself, formed by a cup 15, provided with a transversal terminal element 51, axially slidable on the external surface of said internal casing 6 and urged by a positioning spring 16.

The internal casing 6, in which there are obtained receiving spaces 17 for the protruding elements 11 of the sealing bush 10, has a surface in contact with the external casing 4 provided with a gasket 8 and a surface in contact with said sealing bush 10 provided with a further gasket 19 and with an antiextrusion device 20.

At the end coupled with the male element 2, the external casing 4 has an external thread 5. The external surface of external casing 4 also has an annular space 21 for receiving a circumferential succession of balls 23 held by the male element 2.

The terminal surfaces 25, 26 and 27 of the external casing 4, of the cup 15 and of the axial stem 9, respectively, are arranged so as to form a flat surface globally indicated with 28.

With reference to FIG. 2, the male element 2 comprises an external casing 29, an internal casing 32, arranged concentrically to said external casing 29, a terminal nut 35 screwed into the internal casing 32 for connection to a supply or a user, and a supporting element 34, screwed into the external casing 29 and slidable on the external surface of said terminal nut 35 under the action of a spring 33. The nut 35 and the internal casing 32 define inside them a cavity 36 for the passage of the fluid, wherein there is housed a piston 37 urged by a spring 38 in an axial direction. The seal between the internal casing 32 and the piston 37 is ensured by a gasket 39 and by a plastic ring 40.

In the space between the external casing 29 and the internal casing 32 there is a cup 44 urged by a positioning spring 45 reacting against a ring 46 held between the external casing 29 and the supporting element 34.

The external casing 29 has an internally threaded terminal portion 62. In a position more to the rear, it also supports a ring nut 30, provided with a positioning spring 60 and slidable on the external surface of said terminal portion 62 of the external casing 29. In the proximity of the ring nut 30 the terminal portion 62 has externally an elastic ring 43, whose functions will appear clear later.

An annular notch 41, formed on the internal surface of ring nut 30, is suitable for defining, in the rest position represented in FIG. 2 and together with a corresponding succession of holes 42 of the external casing 29, respective spaces for receiving the balls 23 for fastening said male 2 and female 1 elements.

The terminal surfaces 47, 48 and 49 of the cup 44, of the internal casing 32 and of the piston 37, respectively, are arranged so as to form a flat surface globally indicated with 50.

Starting from the rest position of the two female 1 and male 2 elements of the fitting according to the invention, illustrated in FIGS. 1 and 2, respectively, coupling takes place as follows.

With reference to FIG. 3 the assembly of the fitting starts with the elements 1 and 2 being brought together so that the respective surfaces 28 and 50 are brought into contact. In this regard, the parts of the female and male elements 1 and 3 include coplanar front surfaces at mutually connectable ends, specifically surfaces 27, 26 and 25, and 49, 48. In particular the surface 27 of the enlarged end 13 of the stem 9 is brought into contact with the surface 49 of the piston 37, the surface 26 of the vertical element 51 of the cup 15 is brought into contact with the terminal surface 48 of the internal casing 32 of the male element 2 and lastly the surface 25 of the external casing 4 is brought into contact with the surface 47 of the cup 44.

The first stage of the assembly also provides for the start of the screwing up or threading of the threaded terminal portion 62 of the external casing 29 of said male element 2 on the corresponding threaded portion 5 of the external casing 4 of said female element 1. Such threading causes in the first place the displacement toward the left, with respect to the position at rest, of the external casing 29, slidable on the internal casing 32, and of the support 34, slidable on the nut 35. The motion of the support 34 produces a compression of the spring 33 and, at the same time, involves in the motion the ring 46 that has the function of supporting the spring 45 that is thus urged to compression.

At the same time the terminal portion 62 of the external casing 29 is displaced toward the left, screwing itself up on the external thread of the female element 1.

During this first stage the passage of the fluid inside the fitting is precluded on the basis of the fact that the conduit 61 of the female element 1 is closed due to the engagement between the bush 10 and the stem 9, and the conduit 36 of the male element 2 is closed by the piston 37 (FIG. 3).

The second assembly stage consists in the continuation of the threading operations; when the position of maximum compression of the spring 33 is reached said support 34 is perfectly integral with said internal casing 32 that, as a consequence, is urged toward the left, against the action of the spring 16 that urges the cup 15 into contact with said internal casing 32 and that is, thus, compressed following the displacement toward the left of the cup 15 itself.

The relative motion between said internal casing 32 and the piston 37 that, engaged with the stem 9, remains fixed, causes the piston to assume a position further inside the male element 2, with the consequent compression of the corresponding positioning spring 38.

At the same time the cup 44, kept in contact with the external casing 4, urges a further compression of the spring 45; moreover, the advancement toward the left of the external casing 29 and of its terminal portion 62 continues (FIG. 4).

The third assembly stage consists in the further threading the element 2 on the element 1.

A first consequence of such further threading consists in the spring 45 reaching its maximum compression, urged by the cup 44 that is pushed toward the right. In this position the external casing 29 and the internal casing 32 of the male element 2 are displaced toward the left by an amount such as to allow the balls 23 to be arranged opposite the annular receiving space 21 of the external casing 4 of the female element 1.

At the same time the vertical structure 51 arrives in contact with the protruding elements 11 of the sealing bush 10, that, acting as a shoulder for said structure 51, allow the latter to involve said bush 10 in the motion toward the left. Such motion causes the opening of a conduit between the stem 9 and the cup 15, communicating with the conduit 61.

The piston 37, due to the relative motion toward the left of the internal casing 32 and of the external casing 29, is now further to the rear with respect to the internal casing 32, with the consequent further compression of the positioning spring 38.

The conduit 61 can thus connect itself with the internal conduit 36 of the male element 2, thus allowing the fluid to flow through the entire fitting even though this is not yet fully assembled (FIG. 5).

The last assembly stage of the fitting according to the present invention consists in finishing the threading operations, which leads to the balls 23 sliding out of the annular notch 41 of the ring nut 30 and inside the annular space 21, with the consequent positioning of the balls 23 at a radial distance that is smaller than the prior position. Thus in such a new position the balls 23 no longer prevent the relative motion of the ring nut 30 with respect to the terminal portion 62 of the external casing 29; as a consequence the spring 60, no longer constrained by the presence of the balls 23, urges the ring nut itself to slide along the terminal portion 62 until it reaches the elastic ring 43 that prevents a possible further movement toward the left of said ring nut; this thus remains in a position of equilibrium, holding the balls 23 inside the space 21. Such positioning of the ring nut 30 thus maintains the fitting completely in the coupled position and completes the operations of assembly of the fitting itself. (FIG. 6).

We claim:

1. Quick-coupling pipe fitting, comprising a female element and a male element that can be coupled together, which elements are formed by fixed parts and by axially slidable parts that, when at rest, arrange themselves in a position wherein they close the passage of the fluid and, when the two elements are coupled together, they are displaced by engagement with corresponding parts of the other element in a position wherein the abovementioned passage is open, characterized in that said male and female elements can be coupled together by means of screw-based connecting means and their said parts have coplanar front surfaces at mutually connectable ends, said female element comprising an external casing, an internal coaxial casing inside which there extends a stem fixed to said internal casing, externally to which, so as to leave an annular cavity surrounding said stem, there is a sealing bush elastically urged in a position of sealing engagement with an enlarged end of said stem when said female element is at rest, and an annular base, located between said internal casing and a rear portion of said stem, said annular base provided with at least one port for the passage of fluid, communicating with said cavity, said female element further comprising an axially slidable cup located between the external casing and the internal casing and resiliently urged to a rest position by a positioning spring, said male element being constituted by an external casing, an internal casing arranged concentrically with said external casing, a terminal nut for connection to a supply or a user, screwed into the internal casing, an internal cavity formed in said internal casing and a piston arranged axially in said internal cavity and urged by a corresponding positioning spring in a position where the passage of fluid is closed, said male element also comprising a supporting element, screwed into said external casing and slidable on the external surface of said terminal nut under the action of a spring, an axially slidable cup located between said external casing and said internal casing and urged to a rest position by a positioning spring reacting against a ring held between said external casing and said supporting element.

2. Fitting according to claim 1, characterized in that said terminal surface of the female element is formed by terminal surfaces of the external casing, of the cup and of the axial stem, respectively, and said terminal surface of the male element is formed by terminal surfaces of the cup, of the internal casing and of the piston, respectively.

3. Quick-coupling pipe fitting comprising a female element and a male element that can be coupled together, which elements are formed by fixed pain and by axially slidable parts that, when at rest, arrange themselves in a position wherein they close the passage of the fluid and, when the two elements are fully coupled together, they are displaced by engagement with corresponding parts of the other element in a position wherein the abovementioned passage is open, characterized in that said male and female elements can be coupled together by means of screw-based connecting means and wherein said parts of the male add female elements have coplanar front surfaces at mutually connectable ends before said screw-based connecting means are engaged, said screw-based connecting means comprising an internally threaded terminal portion of the external casing of the male element and a terminal portion of the external casing of the female element provided with an external thread, further including means for clamping the fitting in the coupled position, that comprise a ring nut elastically urged to slide on the external surface of said terminal portion of the external casing of said male element.

4. Fitting according to claim 3, characterized in that said ring nut has an annular notch suitable for defining, together with a corresponding succession of holes of the external casing, respective spaces for receiving balls that make said ring nut fixed to said external casing up to the displacement of said balls in an annular space of the female element at the end of the assembly stage of the same.

* * * * *